United States Patent
Neumann

(10) Patent No.: US 12,413,403 B2
(45) Date of Patent: Sep. 9, 2025

(54) METHOD AND SYSTEM FOR GENERATING CRYPTOGRAPHIC KEYS ASSOCIATED WITH BIOLOGICAL EXTRACTION DATA

(71) Applicant: KPN INNOVATIONS, LLC., Lakewood, CO (US)

(72) Inventor: Kenneth Neumann, Lakewood, CO (US)

(73) Assignee: KPN INNOVATIONS LLC, Lakewood, CO (US)

( * ) Notice: Subject to any disclaimer, the term of this patent is extended or adjusted under 35 U.S.C. 154(b) by 128 days.

(21) Appl. No.: 18/387,624

(22) Filed: Nov. 7, 2023

(65) Prior Publication Data

US 2024/0073012 A1    Feb. 29, 2024

Related U.S. Application Data

(63) Continuation-in-part of application No. 18/111,955, filed on Feb. 21, 2023, now Pat. No. 11,895,235,
(Continued)

(51) Int. Cl.
G06F 21/00 (2013.01)
G06F 18/23 (2023.01)
H04L 9/08 (2006.01)

(52) U.S. Cl.
CPC ............ H04L 9/0861 (2013.01); G06F 18/23 (2023.01)

(58) Field of Classification Search
None
See application file for complete search history.

(56) References Cited

U.S. PATENT DOCUMENTS 9,637,776 B2 * 5/2017 Briska ................. C12Q 1/683
10,530,577 B1 * 1/2020 Pazhoor ............... H04L 9/3247
(Continued)

OTHER PUBLICATIONS

Kim, Wonsuk; Seok, Junhee. Privacy-preserving collaborative machine learning in biomedical applications. 2022 International Conference on Artificial Intelligence in Information and Communication (ICAIIC). https://ieeexplore.ieee.org/stamp/stamp.jsp?tp=&arnumber=9722703 (Year: 2022).*

(Continued)

*Primary Examiner* — Jeremiah L Avery
(74) *Attorney, Agent, or Firm* — Caldwell Intellectual Property Law

(57) ABSTRACT

An apparatus for generating cryptographic keys associated with a biological extraction is disclosed. The apparatus includes at least a processor and a memory communicatively connected to the at least a processor. The memory instructs the processor to receive a plurality of biological extractions from a plurality of users. The memory instructs the processor to classify each of the plurality of biological extractions to a plurality of biological extraction clusters. The memory instructs the processor to generate an interconnection metric as a function of a comparison between the plurality of biological extraction clusters. The memory instructions the processor to generate an interconnection metric as a function of a comparison between the plurality of biological extraction clusters using a metric machine learning model. The memory instructs the processor to generate a cluster key associated with the interconnection metric and a biological extraction cluster of the plurality of biological extraction clusters.

20 Claims, 8 Drawing Sheets

Related U.S. Application Data which is a continuation of application No. 17/884,979, filed on Aug. 10, 2022, now Pat. No. 11,588,630.

(56) References Cited

U.S. PATENT DOCUMENTS

| | | | | |
|---|---|---|---|---|
| 11,063,920 | B2* | 7/2021 | Miller | H04L 9/0891 |
| 11,113,191 | B1* | 9/2021 | Winarski | G06F 3/067 |
| 11,696,926 | B2* | 7/2023 | Christopher | A61K 40/42 |
| | | | | 424/85.5 |
| 2003/0009293 | A1* | 1/2003 | Anderson | G01N 33/6803 |
| | | | | 702/19 |
| 2003/0129603 | A1* | 7/2003 | Wolffe | C12N 15/66 |
| | | | | 536/25.4 |
| 2004/0010504 | A1* | 1/2004 | Hinrichs | G16B 50/00 |
| 2004/0236694 | A1* | 11/2004 | Tattan | G06Q 20/027 |
| | | | | 705/50 |
| 2010/0070448 | A1* | 3/2010 | Omoigui | H10F 39/1825 |
| | | | | 706/55 |
| 2010/0205541 | A1* | 8/2010 | Rapaport | G06Q 30/02 |
| | | | | 715/753 |
| 2014/0121990 | A1* | 5/2014 | Baldi | G16B 50/30 |
| | | | | 702/20 |
| 2014/0359422 | A1* | 12/2014 | Bassett, Jr | G16B 20/00 |
| | | | | 707/754 |
| 2017/0213127 | A1* | 7/2017 | Duncan | G16B 50/30 |
| 2017/0235886 | A1* | 8/2017 | Cox | G16H 10/60 |
| | | | | 705/3 |
| 2017/0277854 | A1* | 9/2017 | Kelly | G16Z 99/00 |
| 2017/0278209 | A1* | 9/2017 | Olsen | G16H 10/60 |
| 2017/0286621 | A1* | 10/2017 | Cox | G16H 50/20 |
| 2017/0286622 | A1* | 10/2017 | Cox | G16H 50/30 |
| 2017/0327890 | A1* | 11/2017 | Saint-Andre | C12Q 1/6883 |
| 2020/0259643 | A1* | 8/2020 | Pazhoor | H04L 67/52 |
| 2021/0090694 | A1* | 3/2021 | Colley | G16B 30/00 |
| 2021/0169417 | A1* | 6/2021 | Burton | A61B 5/4857 |
| 2021/0233665 | A1* | 7/2021 | Kenedy | G06F 16/00 |
| 2021/0371937 | A1* | 12/2021 | Wang | C12Q 1/6886 |
| 2022/0215935 | A1* | 7/2022 | Chennubhotla | G06V 20/695 |
| 2023/0113316 | A1* | 4/2023 | Neumann | G16H 50/30 |
| | | | | 705/2 |

OTHER PUBLICATIONS

Sarkar, Esha et al. Fast and Scalable Private Geontype Imputation Using Machine Learning and Partially Homomorphic Encryption. IEEE Access, vol. 9. https://ieeexplore.ieee.org/stamp/stamp.jsp?tp=&arnumber=9466098 (Year: 2021).*

Arslan, Bilgehan et al. Machine Learning Methods Used in Evaluations of Secure Biometric System Components. 2017 16th IEEE International Conference on Machine Learning and Applications (ICMLA). https://ieeexplore.ieee.org/stamp/stamp.jsp?tp=&arnumber=8260672 (Year: 2017).*

Ristevski, Blagoj et al. Using Graph Databases for Portraying and Analysing Biological and Biomedical Networks. 022 8th International Conference on Control, Decision and Information Technologies (CoDIT). https://ieeexplore.ieee.org/stamps/stamps.j?tp=&arnumber=9804139 (Year: 2022).

Kannan, S. Thabasu; Iyakutti, K. A clustered indexing method for optimizing the query for biological database. 2009 5th IEEE GCC Conference & Exhibition/ https://irrrxplore.ieee.org/stamp/stamp.jsp?tp=arnumber-5734246 (year:2009).

Seo, Dongmin et al. Development of biological network crawling, clustering and visualization system. 2017 14th International Conference on Electrical Engineering/Electronics, Computer, Telecommunications and Information Technology. https://ieeexplore.ieee.ord/stamp/stamp.jsp?tp+&arnumber= 8096341 (Year:2017).

Sharma Asuda; Ali, Hesham H. Analysis of Clustering algorithms in biological networks. 2017 IEEE International Conference on Bioinformatics and Biomedicine (BIBM). https://ieeexplore.ieee.org/stamp/stamp.jsp?tp=&arnumber=9218036 (Year:2017).

Li, Tao; Liu, Chao. Data "Audit" Research Based on the Accounting Information Systems. 2010 International Conference on E-Business and E-Government. https://ieeexplore.iee.org/stamp/stamp.jsp?tp=&arnumber-9436615 (Year: 2020).

Therar, Huda M. et al. Biometric Signature Based Public Key Security System. 2020 International Conference on Advance Science and Engineering (ICOASE). https://eeexplore.ieee.org/stamp/stamp.jsp?tp=&arnumber+9436615 (Year:2020).

* cited by examiner

METHOD AND SYSTEM FOR GENERATING CRYPTOGRAPHIC KEYS ASSOCIATED WITH BIOLOGICAL EXTRACTION DATA

RELATED APPLICATION DATA

This application is a continuation-in-part of a U.S. Nonprovisional patent application Ser. No. 18/111,955, filed on Feb. 21, 2023, and titled "METHOD AND SYSTEM FOR GENERATING KEYS ASSOCIATED WITH BIOLOGICAL EXTRACTION CLUSTER CATEGORIES" which is a continuation of U.S. Nonprovisional patent application Ser. No. 17/884,979, filed on Aug. 10, 2022, and titled "METHOD AND SYSTEM FOR GENERATING KEYS ASSOCIATED WITH BIOLOGICAL EXTRACTION CLUSTER CATEGORIES," which is incorporated herein by reference in entirety.

FIELD OF THE INVENTION

The present invention generally relates to the field of AI and simulation/modeling. In particular, the present invention is directed to a method and system for generating keys associated with biological extraction cluster categories.

BACKGROUND

There is a need for a grouping mechanism for biological tendencies. However, biological tendencies are often complex and seemingly unrelated. As a result, biological tendencies that might be correlated are not grouped together.

SUMMARY OF THE DISCLOSURE

In an aspect, an apparatus for generating cryptographic keys associated with a biological extraction is disclosed. The apparatus includes at least a processor and a memory communicatively connected to the at least a processor. The memory instructs the processor to receive a plurality of biological extractions from a plurality of users. The memory instructs the processor to classify each of the plurality of biological extractions to a plurality of biological extraction clusters. The memory instructions the processor to generate an interconnection metric as a function of a comparison between the plurality of biological extraction clusters using a metric machine learning model. The memory instructs the processor to generate a cluster key associated with the interconnection metric and a biological extraction cluster of the plurality of biological extraction clusters.

In another aspect, a method for generating cryptographic keys associated with a biological extraction is disclosed. The method includes receiving a plurality of biological extractions from a plurality of users. The method includes classifying each of the plurality of biological extractions to a plurality of biological extraction clusters. The method includes generating an interconnection metric as a function of a comparison between the plurality of biological extraction clusters using a metric machine learning model. The method includes generating a cluster key associated with the interconnection metric and a biological extraction cluster of the plurality of biological extraction clusters.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
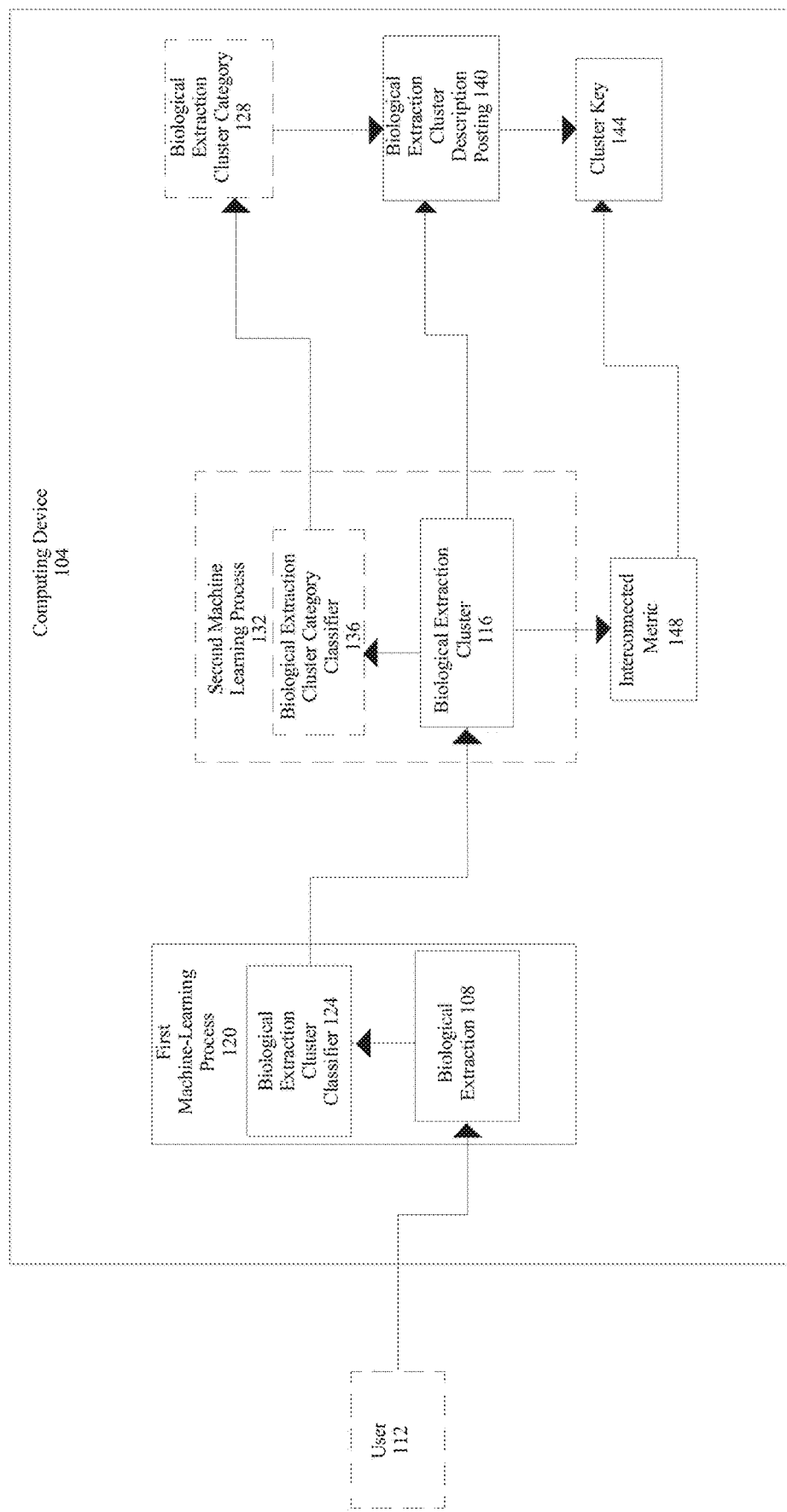
FIG. 1 is a flow diagram illustrating an apparatus for generating keys associated 'with biological extraction cluster categories.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, a system for tracking clusters in an immutable sequential listing is disclosed. The system includes at least a processor and a memory communicatively connected to the at least a processor, the memory containing instructions configuring the processor to receive a new record, obtain a sub-listing of an immutable sequential listing, wherein the sub-listing comprises a biological extraction cluster description posting of a biological extraction cluster and a cluster key, update the biological extraction cluster description posting using the new record, generate a new sub-listing and update the new sub-listing to the immutable sequential listing.

Additionally, an apparatus for generating cryptographic keys associated with a biological extraction is disclosed. The apparatus includes at least a processor and a memory communicatively connected to the at least a processor. The memory instructs the processor to receive a plurality of biological extractions from a plurality of users. The memory instructs the processor to classify each of the plurality of biological extractions to a plurality of biological extraction clusters. The memory instructions the processor to generate an interconnection metric as a function of a comparison between the plurality of biological extraction clusters using a metric machine learning model. The memory instructs the processor to generate a cluster key associated with the interconnection metric.

Aspects of the present disclosure can be used to group biological extraction data based on at least one commonality. Aspects of the present disclosure can also be used to link biological extraction data to other related biological extraction data. This is so, at least in part, because biological extraction clusters group narrow biological extraction data into broader categories.

Exemplary embodiments illustrating aspects of the present disclosure are described below in the context of several specific examples.

In an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where $A+B=-R$, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Continuing to refer to FIG. 1, a "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

Referring now to FIG. 1, an exemplary embodiment of a system 100 for generating keys associated with biological extraction cluster categories is illustrated. System includes a computing device 104. Computing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting Computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or biological extraction cluster of computing devices in a first location and a second computing device or biological extraction cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device.

With continued reference to FIG. 1, Computing device 104 may be designed and/or configured to perform any method, method step, or sequence of method steps in any embodiment described in this disclosure, in any order and with any degree of repetition. For instance, Computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Referring now to FIG. 1, computing device 104 may be configured to receive biological extraction 108 from user 112. As used herein, a "biological extraction" refers to any element and/or elements of data suitable for use as at least an element of physiological state data. A biological extraction may include a physically extracted sample, where a "physically extracted sample" as used in this disclosure is a sample obtained by removing and analyzing tissue and/or fluid. Physically extracted sample may include without limitation a blood sample, a tissue sample, a buccal swab, a mucous sample, a stool sample, a hair sample, a fingernail sample, or the like. Physically extracted sample may include, as a non-limiting example, at least a blood sample. As a further non-limiting example, a biological extraction may include at least a genetic sample. At least a genetic sample may include a complete genome of a person or any portion thereof. At least a genetic sample may include a DNA sample and/or an RNA sample. At least a biological extraction may include an epigenetic sample, a proteomic sample, a tissue sample, a biopsy, and/or any other physically extracted sample. At least a biological extraction may include an endocrinal sample.

Still referring to FIG. 1, as a further non-limiting example, the at least a biological extraction may include a signal from at least a sensor configured to detect physiological data of a user and recording the at least a biological extraction as a function of the signal. At least a sensor may include any medical sensor and/or medical device configured to capture sensor data concerning a patient, including any scanning, radiological and/or imaging device such as without limitation x-ray equipment, computer assisted tomography (CAT) scan equipment, positron emission tomography (PET) scan equipment, any form of magnetic resonance imagery (MRI) equipment, ultrasound equipment, optical scanning equipment such as photo-plethysmographic equipment, or the like. At least a sensor may include any electromagnetic sensor, including without limitation electroencephalographic sensors, magnetoencephalographic sensors, electrocardiographic sensors, electromyographic sensors, or the like. At least a sensor may include a temperature sensor. At least a sensor may include any sensor that may be included in a mobile device and/or wearable device, including without limitation a motion sensor such as an inertial measurement unit (IMU), one or more accelerometers, one or more gyroscopes, one or more magnetometers, or the like. At least a wearable and/or mobile device sensor may capture step, gait, and/or other mobility data, as well as data describing activity levels and/or physical fitness. At least a wearable and/or mobile device sensor may detect heart rate or the like. At least a sensor may detect any hematological parameter including blood oxygen level, pulse rate, heart rate, pulse rhythm, and/or blood pressure. At least a sensor may be a part of system 100 or may be a separate device in communication with system 100.

Still referring to FIG. 1, at least a first biological extraction may include data describing one or more test results, including results of mobility tests, stress tests, dexterity tests, endocrinal tests, genetic tests, psychological tests and/or evaluations, electromyographic tests, biopsies, radiological tests, genetic tests, and/or sensory tests. A biological extraction may include biological extraction elements. As used herein, a "biological extraction element" refers to a datum within the biological extraction. In a non-limiting embodiment, some examples of biological extractions may be blood samples, teeth, hair, bone marrow, saliva, and the like. Biological extract 108 may be submitted by user 112. As used herein, "user" refers to an organism. A user may include a person or other organism who provides the biological extraction 108. Alternatively, a user may be a medical professional who is submitting the biological extraction 108 on behalf of his/her patient. In a non-limiting embodiment, user 112 may submit a sample of saliva to computing device 104 so that a biological extraction analysis may be performed. Additional disclosure related to biological extractions may be found in U.S. patent application Ser. No. 16/372,512, filed on Apr. 2, 2019, and entitled "METHODS AND SYSTEMS FOR UTILIZING DIAGNOSTICS FOR INFORMED VIBRANT CONSTITUTIONAL GUIDANCE," the entirety of which is incorporated herein by reference.

Still referring to FIG. 1, a biological extraction may include data describing one or more test results, including results of mobility tests, stress tests, dexterity tests, endocrinal tests, genetic tests, and/or electromyographic tests, biopsies, radiological tests, genetic tests, and/or sensory tests. Persons skilled in the art, upon reviewing the entirety of this disclosure, will be aware of various additional examples of at least a physiological sample consistent with this disclosure.

Still referring to FIG. 1, in some embodiments, computing device 104 is further configured to generate, using biological extraction 108, biological extraction cluster 116. A "biological extraction cluster" refers to a classification phrase applied to biological extractions with at least one commonality. A biological extraction cluster may have consistent biological extraction elements. A non-limiting example of a biological extraction cluster may include using biological extractions with a commonality of heart palpitations, the biological extractions may have several different data representations, but they may all have heart palpitations identified as a potential abnormality. The biological extraction cluster may then be referred to as a heart palpitation cluster, indicating that biological extractions located within this biological extraction cluster have something to do with heart palpitations. In some cases, one or more machine learning processes are employed in generating biological extraction cluster 116. For instance, first machine learning process 120 may include utilizing biological extraction cluster classifier 124 and generating a biological extraction cluster 116 as a function of first machine learning process 120 and biological extraction 108. First machine learning process 120 may refer to any machine learning process described in this disclosure; and biological extraction cluster classifier 124 may refer to any classification or machine learning algorithm used in this disclosure. Further explanation of machine learning processes can be found below, in detail. Biological extraction cluster classifier 124 is also described in great detail below.

With further reference to FIG. 1, the biological extraction cluster 116 may include a parsing module that is configured to generate a query using at least a biological extraction. The parsing module then may retrieve consistent or correlating biological extraction elements as a function of the query. The parsing module may be configured to sort through the individual elements of the biological extraction to look for elements that may be grouped together based on at least a commonality. A "query" as used herein, is at least a datum used to retrieve biological extraction elements from a received biological extraction. The parsing module may generate at least a query by extracting one or more biological extraction elements from the received biological extraction, and/or analyzing one or more correlated biological extraction elements. The parsing module may simultaneously parse through multiple biological extractions to find consistent biological extraction elements through a larger data set. The parsing module may also be used to retrieve consistent or correlating biological extraction clusters which can then be formed into biological extraction cluster categories.

With continued reference to FIG. 1, a medical professionals may input a simulated biological extraction cluster. As used in the current disclosure, a "simulated biological extraction cluster" is a biological extraction cluster that has be created by a user. A simulated biological extraction cluster may be generated by a user by modifying an existing biological extraction clusters 116. Alternatively, a simulated biological extraction cluster may include biological extraction clusters that are completely. These simulated biological extraction cluster may be used as training data for the machine learning models discussed herein. Simulated biological extraction clusters may contain any combination of features, symptoms, test results, and the like that may be within a biological extraction cluster 116 as disclosed herein.

In some cases, and with further reference to FIG. 1, biological extraction cluster classifier 124 classifies biological extraction elements to biological extraction clusters. In some cases, computing device 104 may further be configured to output biological extraction cluster 116 by receiving biological extraction cluster classification training data, training a biological extraction cluster classifier as a function of a biological extraction cluster classification algorithm and the biological extraction cluster classification training data, correlating at least a biological extraction element to at least a bin of a plurality of bins, as a function of the biological extraction cluster classifier 124 and biological extraction 108. In some cases, biological extraction cluster classifier 124 may correlate a plurality of biological extraction elements to a plurality of bins. As used herein, "biological extraction element" refers to a specific part of the biological extraction. For example, if a blood sample is taken as a biological extraction, a biological extraction element may be the quantity of red blood cells within the sample. The term "bin" as used herein, refers to a grouping or categorization of biological extraction elements. The term bin may be synonymous with the term cluster. Biological extraction cluster classification training data may include any training data described throughout this disclosure. Likewise, biological extraction cluster classifier 124 and biological extraction cluster classification algorithm may include any classification models, algorithms or processes described throughout this disclosure, include but limited to machine learning processes, classifiers and the like. In some embodiments, classifying the biological extractions to biological extraction clusters may include non-disjointed biological extraction clusters. The term "non-disjoint clustering" as used herein, refers to a form of categorization that overlaps biological extraction clusters with other biological extraction cluster if they share at least one common characteristic. In a non-limiting embodiment, an eczema biological extraction cluster might have some common characteristics as a psoriasis cluster, therefore there may be some overlapping areas or biological extractions that are common to both biological extraction clusters.

Still referring to FIG. 1, biological extraction cluster 116 may be determined using a distance of and/or used in a classifier. A classifier used to compute distance may include, without limitation, a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more biological extraction clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements. KNN algorithm may operate according to any suitable distance, including without limitation vector similarity as described above.

With continued regards to FIG. 1, computing device 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)+P(B), where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

Still referring to FIG. 1, classifiers may be trained by training data associating biological extraction data to cluster. Biological extraction data elements may be parsed through to assign the biological extraction to a cluster. Classifier may be trained to recognize consistencies within different biological extractions and classify them together in a cluster based on consistencies that may not be evident initially. Clusters may be generated using a clustering algorithm which may operate on a multi-user dataset. A non-limiting embodiment of a multi-user dataset may include a biological extraction of multiple users. Classifiers used within the disclosure may implement K-means clustering, particle swarm optimization and the like.

Continuing refer to FIG. 1, a feature learning and/or clustering algorithm may be implemented, as a non-limiting example, using a k-means clustering algorithm. A "k-means clustering algorithm" as used in this disclosure, includes cluster analysis that partitions n observations or unclassified cluster data entries into k clusters in which each observation or unclassified cluster data entry belongs to the cluster with the nearest mean, using, for instance behavioral training set as described above. "Cluster analysis" as used in this disclosure, includes grouping a set of observations or data entries in way that observations or data entries in the same group or cluster are more similar to each other than to those in other groups or clusters. Cluster analysis may be performed by various cluster models that include connectivity models such as hierarchical clustering, centroid models such as k-means, distribution models such as multivariate normal distribution, density models such as density-based spatial clustering of applications with nose (DB SCAN) and ordering points to identify the clustering structure (OPTICS), subspace models such as biclustering, group models, graph-based models such as a clique, signed graph models, neural models, and the like. Cluster analysis may include hard clustering whereby each observation or unclassified cluster data entry belongs to a cluster or not. Cluster analysis may include soft clustering or fuzzy clustering whereby each observation or unclassified cluster data entry belongs to each cluster to a certain degree such as for example a likelihood of belonging to a cluster; for instance, and without limitation, a fuzzy clustering algorithm may be used to identify clustering of gene combinations with multiple disease states, and vice versa. Cluster analysis may include strict partitioning clustering whereby each observation or unclassified cluster data entry belongs to exactly one cluster. Cluster analysis may include strict partitioning clustering with outliers whereby observations or unclassified cluster data entries may belong to no cluster and may be considered outliers. Cluster analysis may include overlapping clustering whereby observations or unclassified cluster data entries may belong to more than one cluster. Cluster analysis may include hierarchical clustering whereby observations or unclassified cluster data entries that belong to a child cluster also belong to a parent cluster.

With continued reference to FIG. 1, computing device may generate a k-means clustering algorithm receiving unclassified physiological state data and outputs a definite number of classified data entry clusters wherein the data entry clusters each contain cluster data entries. K-means algorithm may select a specific number of groups or clusters to output, identified by a variable "k." Generating a k-means clustering algorithm includes assigning inputs containing unclassified data to a "k-group" or "k-cluster" based on feature similarity. Centroids of k-groups or k-clusters may be utilized to generate classified data entry cluster. K-means clustering algorithm may select and/or be provided "k" variable by calculating k-means clustering algorithm for a range of k values and comparing results. K-means clustering algorithm may compare results across different values of k as the mean distance between cluster data entries and cluster centroid. K-means clustering algorithm may calculate mean distance to a centroid as a function of k value, and the location of where the rate of decrease starts to sharply shift, this may be utilized to select a k value. Centroids of k-groups or k-cluster include a collection of feature values which are utilized to classify data entry clusters containing cluster data entries. K-means clustering algorithm may act to identify clusters of closely related physiological data, which may be provided with user cohort labels; this may, for instance, generate an initial set of user cohort labels from an initial set of user physiological data of a large number of users, and may also, upon subsequent iterations, identify new clusters to be provided new user cohort labels, to which additional user physiological data may be classified, or to which previously used user physiological data may be reclassified.

With continued reference to FIG. 1, generating a k-means clustering algorithm may include generating initial estimates for k centroids which may be randomly generated or randomly selected from unclassified data input. K centroids may be utilized to define one or more clusters. K-means clustering algorithm may assign unclassified data to one or more k-centroids based on the squared Euclidean distance by first performing a data assigned step of unclassified data. K-means clustering algorithm may assign unclassified data to its nearest centroid based on the collection of centroids ci of centroids in set C. Unclassified data may be assigned to a cluster based on $argmin_{ci \ni C}$ dist(ci,x)$^2$, where argmin includes argument of the minimum, ci includes a collection of centroids in a set C, and dist includes standard Euclidean distance. K-means clustering module may then recompute centroids by taking mean of all cluster data entries assigned to a centroid's cluster. This may be calculated based on ci=1/|Si|Σxi∋ Si$^{xi}$. K-means clustering algorithm may continue to repeat these calculations until a stopping criterion has been satisfied such as when cluster data entries do not change clusters, the sum of the distances have been minimized, and/or some maximum number of iterations has been reached.

Still referring to FIG. 1, k-means clustering algorithm may be configured to calculate a degree of similarity index value. A "degree of similarity index value" as used in this disclosure, includes a distance measurement indicating a measurement between each data entry cluster generated by k-means clustering algorithm and a selected physiological data set. Degree of similarity index value may indicate how close a particular combination of genes, negative behaviors and/or negative behavioral propensities is to being classified by k-means algorithm to a particular cluster. K-means clustering algorithm may evaluate the distances of the combination of genes, negative behaviors and/or negative behavioral propensities to the k-number of clusters output by k-means clustering algorithm. Short distances between a set of physiological data and a cluster may indicate a higher degree of similarity between the set of physiological data and a particular cluster. Longer distances between a set of physiological behavior and a cluster may indicate a lower degree of similarity between a physiological data set and a particular cluster.

With continued reference to FIG. 1, k-means clustering algorithm selects a classified data entry cluster as a function of the degree of similarity index value. In an embodiment, k-means clustering algorithm may select a classified data entry cluster with the smallest degree of similarity index value indicating a high degree of similarity between a physiological data set and the data entry cluster. Alternatively or additionally k-means clustering algorithm may select a plurality of clusters having low degree of similarity index values to physiological data sets, indicative of greater degrees of similarity. Degree of similarity index values may be compared to a threshold number indicating a minimal degree of relatedness suitable for inclusion of a set of physiological data in a cluster, where degree of similarity indices a-n falling under the threshold number may be included as indicative of high degrees of relatedness. The above-described illustration of feature learning using k-means clustering is included for illustrative purposes only, and should not be construed as limiting potential implementation of feature learning algorithms; persons skilled in the art, upon reviewing the entirety of this disclosure, will be aware of various additional or alternative feature learning approaches that may be used consistently with this disclosure.

With continued reference to FIG. 1, in some embodiments, computing device 104 is further configured to generate, using biological extraction cluster 116, biological extraction cluster category 128. "Biological extraction cluster category" as used herein, is a label that identifies a group of biological extraction clusters. In a non-limiting embodiment, a biological extraction cluster category may identify a plurality of biological extraction clusters associated with cardiovascular health. These biological extraction clusters may then be grouped into a cardiovascular biological extraction cluster category. The cardiovascular biological extraction cluster category may contain biological extraction clusters dealing with heart health. palpitations. In some cases, one or more machine learning processes are employed in generating biological extraction cluster category 128. For instance, second machine learning process 132 may include utilizing biological extraction cluster category classifier 136 and generating a biological extraction cluster category 128 as a function of second machine learning process 132 and biological extraction cluster 116. Second machine learning process 132 may refer to any machine learning process described in this disclosure; and biological extraction cluster category classifier 136 may refer to any classification or machine learning algorithm used in this disclosure. Further explanation of machine learning processes can be found below, in detail. Biological extraction cluster category classifier 128 is also described in great detail below.

In some cases, and with further reference to FIG. 1, biological extraction cluster category classifier 136 classifies biological extraction clusters to biological extraction cluster categories. In some cases, computing device 104 may further be configured to output biological extraction cluster category 128 by receiving biological extraction cluster category classification training data, training a biological extraction cluster category classifier as a function of a biological extraction cluster category classification algorithm and the biological extraction cluster category classification training data, correlating at least a biological extraction cluster element to at least a bin of a plurality of bins, as a function of the biological extraction cluster category classifier 136 and biological extraction cluster 116. In some cases, biological extraction cluster category classifier 136 may correlate a plurality of biological extraction cluster elements to a plurality of category bins. As used herein, "biological extraction cluster element" refers to a specific part of the cluster. For example, if the biological extraction cluster is a heart palpitation cluster, a biological extraction cluster element may be high blood pressure. The term "category bin" as used herein, refers to a grouping or categorization of biological extraction cluster elements. The term category bin may be synonymous with the term biological extraction cluster category. Biological extraction cluster category classification training data may include any training data described throughout this disclosure. Likewise, biological extraction cluster category classifier 136 and biological extraction cluster category classification algorithm may include any classification models, algorithms or processes described throughout this disclosure, include but limited to machine learning processes, classifiers and the like. Biological extraction cluster category classifier 136 may be consistent with biological extraction cluster classifier 124.

Still referring to FIG. 1, computing device 104 may be configured to produce a biological extraction cluster description posting 140. As used herein, a "biological extraction cluster description posting" refers to data uploaded to the temporal sequential spread pertaining to a specified biological extraction cluster or biological extraction cluster category. Biological extraction cluster description 140 may be posted onto an immutable sequential listing. Biological extraction cluster description 140 may generate a digest. A digest measures the short fixed-length value derived from a variable-length input. In other words, a digest may measure the size of the numeric representation of the contents of a message, computed by a has function. As used herein, "cryptographic hashing" refers to an algorithm that takes an arbitrary amount of data input—a credential—and produces a fixed-size output of enciphered text called a hash value, or just "hash." A Hash may also be a keyed hash, which may also be producing using they cluster key. That enciphered text can then be stored instead of the password itself, and later used to verify the user. The cluster-description-generated digest may then be signed with cluster key 144. As used herein, "cluster key" is a secret datum associated with a biological extraction cluster, which may be usable for a digital signature. A single key may be used in one or more digital signatures as described in further detail below, such as signatures used to receive and/or transfer possession of crypto-currency assets; the key may be discarded for future use after a set period of time. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. In some embodiment, a user may be assigned a cluster key as a function of being connected to at least one additional user, wherein a connection between two user may include facilitating communication between the users as mentioned herein below. The assignment of a cluster key may include tailoring and or creating a cluster key for the specific patient or user in order to foster collaboration between the parties. The cluster key may give each connected user access to data associated with the biological extraction 108, biological extraction cluster 116, the interconnected metric 148, and the like. Connecting the users may include establishing a communicative connection between the users.

Further referring to FIG. 1, keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem. Non-limiting examples of cluster keys may be private keys, public keys, and the like. Biological extraction cluster description 140 may update the biological extraction cluster description using a timestamp validation confirmation. As used herein, a "timestamp validation confirmation" is r a confirmation protocol utilized to ensure data within biological extraction clusters is correct and includes the most recent version. Timestamp validation confirmation may signal a record check if the biological extraction data hasn't been updated in a specified amount of time. A timestamp validation confirmation signal may manifest in a variety of ways, including but not limited to, an email notification, letter communication, text message, digital message, and the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

Still referring to FIG. 1, a cluster key may include a decentralized token. As used in the current disclosure, a "decentralized token" is a digital asset that operates on a decentralized network, typically utilizing an immutable sequential listing. A decentralized token may utilizes a decentralized network of nodes for validation and consensus, eliminating the need for a central authority and enhancing security through the redundancy and distributed nature of the network. The token's security is maintained through cryptographic algorithms, ensuring authentication, confidentiality, and integrity of transactions and data, bolstering trust and transparency within the decentralized ecosystem. A decentralized token may be governed by a distributed and often immutable sequential listing, where transactions and ownership are recorded and verified through a consensus mechanism involving a network of participants.

Still referring to FIG. 1, as a non-limiting example, secure proof may be generated using a secure timestamp. Generating the secure timestamp may include digitally signing the secure timestamp using any digital signature protocol as described above. Secure timestamp may be recorded the current time in a hash chain. In an embodiment, a hash chain includes a series of hashes, each produced from a message containing a current time stamp (i.e., current at the moment the hash is created) and the previously created hash, which may be combined with one or more additional data; additional data may include a random number, which may be generated for instance using a secure computing module 116. Additional data may be hashed into a Merkle tree or other hash tree, such that a root of the hash tree may be incorporated in an entry in hash chain. It may be computationally infeasible to reverse hash any one entry, particularly in the amount of time during which its currency is important; it may be astronomically difficult to reverse hash the entire chain, rendering illegitimate or fraudulent timestamps referring to the hash chain all but impossible. A purported entry may be evaluated by hashing its corresponding message. In an embodiment, the trusted timestamping procedure utilized is substantially similar to the RFC 3161 standard. In this scenario, the received data signals are locally processed at the listener device by a one way function, e.g. a hash function, and this hashed output data is sent to a timestamping authority (TSA). The use of secure timestamps as described herein may enable systems and methods as described herein to instantiate attested time. Attested time is the property that a device incorporating a local reference clock may hash data, e.g. sensor data, along with the local timestamp of the device. Attested time may additionally incorporate attested identity, attested device architecture and other pieces of information identifying properties of the attesting device. In one embodiment, secure timestamp is generated by a trusted third party (TTP) that appends a timestamp to the hashed output data, applies the TSA private key to sign the hashed output data concatenated to the timestamp, and returns this signed, a.k.a. trusted time-stamped data back to the listener device. In an embodiment, secure proof is generated using an attested computing protocol; this may be performed, as a non-limiting example, using any protocol for attested computing as described above.

Biological extraction cluster description 140 may update the biological extraction cluster description postings when new records are made available. The term "new records" as used herein, refers to updates in the biological extraction data used within the biological extraction cluster or biological extraction cluster categories. In a non-limiting embodiment, new records such as new medical discoveries, new prescribed medications, updates to health charts, new symptoms may be added to the original biological extraction data that was previously entered. When the biological extraction cluster description posting is updated using the new records, processor 104 may re-generate a new biological extraction cluster description posting label. The new biological extraction cluster description posting may produce a new cluster key that is signed with the cluster key from the previous biological extraction cluster description posting. The term "re-generate" as used herein, refers to the process of creating new biological extraction cluster description posting based on the new records. The term "new biological extraction cluster description posting label" refers to an updated biological extraction cluster posting based on updates in the biological extraction data. The term "previous biological extraction cluster description posting" refers to the most recent version of the biological extraction cluster description posting that was entered before the addition of new records.

With continued reference to FIG. 1, processor 104 is configured to generate an interconnection metric 148 as a function of a comparison between the plurality of biological extraction clusters 116. As used in the current disclosure, a "interconnection metric" is a measure that quantifies the similarity or dissimilarity between the data points within and between the plurality of biological extraction clusters 116. An interconnection metric 148 may include the similarities or dissimilarities between the physically extracted sample represented by the biological sample. This may include the similarities or dissimilarities based on a number of measured criteria. Measured criteria may size, shape, test results, timing, and the like. In an embodiment, the interconnection metric 148 may be reflected as a single metric or a set of metrics that represent the similarity or dissimilarity between the clusters. Depending on the application, this could be a single value or a set of values reflecting various aspects of the comparison. In some cases, an interconnection metric 148 may include the differences between the clusters based one or more statical metrics. This may include metrics like Euclidean distance, cosine similarity, mahalanobis distance, Manhattan distance, hamming distance, Jaccard index, Minkowski distance, Kullback-Leibler Divergence, and the like. The interconnection metric 148 may detail similarities/differences between patients who are similarly situated according to one or more demographic classifications. This may include age, height, weight, ethnicity, lifestyle choices, familial background, and the like. In some cases, the interconnection metric 148 may include physical differences in the biological extractions 108 represented by the biological extraction clusters 116 or tests performed on samples represented in the biological extraction 108. This may include the ineffectiveness/effectiveness of treatments associated with the biological extraction clusters 116. In a non-limiting example, an interconnection metric 148 may detail the rate of shrinkage/growth of tumor represented by the plurality of biological extraction clusters 116. When generating the interconnection metric 148, processor 104 may preprocess the plurality of biological extraction clusters 116. This may involve organizing the data into vectors or matrices, depending on the metric's requirements. To generate an interconnection metric 148, processor 104 may identify the relevant features from the biological extraction clusters 116.

With continued reference to FIG. 1, processor 104 generates the interconnection metric 148 as a function of a comparison between the plurality of biological extraction clusters 116. Comparing two or more clusters may involve evaluating their similarities and differences to understand the characteristics of the data within each cluster. Comparison of multiple biological extraction clusters 116 may include a comparison cluster assignment, cluster size, centroid comparison, cluster spread, density and compactness, visualization, silhouette score, inter-cluster distances, statistical tests, domain-specific analysis, and the like. To facilitate a cluster comparison processor 104 may identify and label each data point within its corresponding biological extraction clusters 116. In embodiment, processor 104 may compare the plurality of biological extraction clusters 116 according the size (number of data points) of each cluster. This may provide an understanding of the distribution of data within the clusters. In another embodiment, processor 104 may compare the plurality of biological extraction clusters 116 according to the centroid for each cluster. The centroid represents the mean of the data points in the cluster. Compare the centroids to understand the central tendencies of the clusters. In an additional embodiment, processor 104 may compare the plurality of biological extraction clusters 116 by evaluating the density and compactness of each cluster. Density refers to how closely data points are packed together within the cluster, while compactness measures how close each data point is to the centroid.

With continued reference to FIG. 1, processor 104 is configured to compare the plurality of biological extraction clusters using a metric machine-learning model. As used in the current disclosure, a "metric machine-learning model" is a machine-learning model that is configured to generate interconnection metric 148. Metric machine-learning model may be consistent with the machine-learning model described below in FIG. 3. Inputs to the metric machine-learning model may include biological extraction 108, biological extraction cluster 116, biological extraction cluster category 128, biological extraction cluster description 140, examples of interconnection metric 148, and the like. Outputs to the metric machine-learning model may include interconnection metric 148 tailored to the plurality of biological extraction clusters 116. Metric training data may include a plurality of data entries containing a plurality of inputs that are correlated to a plurality of outputs for training a processor by a machine-learning process. In an embodiment, metric training data may include a plurality of plurality of biological extraction clusters 116 correlated to examples of interconnection metric 148. Metric training data may additionally contain multiple biological extraction clusters 116 from users similarly situated to the current patient correlated to examples of interconnection metrics 148. Metric training data may be received from a database. Metric training data may contain information about biological extraction 108, biological extraction cluster 116, biological extraction cluster category 128, biological extraction cluster description 140, examples of interconnection metric 148, examples of interconnection metric 148, and the like. In an embodiment, metric training data may be iteratively updated as a function of the input and output results of past metric machine-learning model or any other machine-learning model mentioned throughout this disclosure. The machine-learning model may be performed using, without limitation, linear machine-learning models such as without limitation logistic regression and/or naive Bayes machine-learning models, nearest neighbor machine-learning models such as k-nearest neighbors machine-learning models, support vector machines, least squares support vector machines, fisher's linear discriminant, quadratic machine-learning models, decision trees, boosted trees, random forest machine-learning model, and the like.

With continued reference to FIG. 1, machine learning plays a crucial role in enhancing the function of software for generating a metric machine-learning model. This may include identifying patterns within the biological extraction clusters 116 that lead to the generation of interconnection metrics 148. By analyzing vast amounts of data related to biological extraction clusters 116, machine learning algorithms can identify patterns, correlations, and dependencies that contribute to a generating the metric machine-learning model. These algorithms can extract valuable insights from the user's biological extraction clusters 116. By applying machine learning techniques, the software can generate an extremely accurate metric machine-learning model. Machine learning models may enable the software to learn from past collaborative experiences of the entities and iteratively improve its training data over time.

With continued reference to FIG. 1, processor 104 may be configured to update the training data of the metric machine-learning model using user inputs. A metric machine-learning model may use user input to update its training data, thereby improving its performance and accuracy. In embodiments, the metric machine-learning model may be iteratively updated using input and output results of the metric machine-learning model as training data. The metric machine-learning model may then be iteratively retrained using the updated training data. For instance, and without limitation, metric machine-learning model may be trained using first training data from, for example, and without limitation, training data from a user input or database. The metric machine-learning model may then be updated by using previous inputs and outputs from the metric machine-learning model as the second training data to then train a second machine learning model. This process of updating the metric machine-learning model may be continuously done to improve the speed and accuracy of the metric machine-learning model. When users interact with the software, their actions, preferences, and feedback provide valuable information that can be used to refine and enhance the model. This user input is collected and incorporated into the training data, allowing the machine learning model to learn from real-world interactions and adapt its predictions accordingly. By continually incorporating user input, the model becomes more responsive to user needs and preferences, capturing evolving trends and patterns. This iterative process of updating the training data with user input enables the machine learning model to deliver more personalized and relevant results, ultimately enhancing the overall user experience. The discussion within this paragraph may apply to both the metric machine-learning model or any other machine-learning models/classifiers discussed herein.

Incorporating the user feedback may include updating the training data by removing or adding correlations of user data to a path or resources as indicated by the feedback. Any machine-learning model as described herein may have the training data updated based on such feedback or data gathered using a web crawler as described above. For example, correlations in training data may be based on outdated information wherein, a web crawler may update such correlations based on more recent resources and information.

With continued reference to FIG. 1, processor 104 may use user feedback to train the machine-learning models and/or classifiers described above. For example, metric machine-learning model may be trained using past inputs and outputs of metric machine-learning model. In some embodiments, if user feedback indicates that an output of machine-learning models and/or classifiers was "bad," then that output and the corresponding input may be removed from training data used to train classifier, and/or may be replaced with a value entered by, e.g., another value that represents an ideal output given the input the machine-learning models and/or classifiers originally received, permitting use in retraining, and adding to training data; in either case, metric machine-learning model may be retrained with modified training data as described in further detail below. In some embodiments, training data of metric machine-learning model may include user feedback.

With continued reference to FIG. 1, in some embodiments, an accuracy score may be calculated for metric machine-learning model using user feedback. For the purposes of this disclosure, "accuracy score," is a numerical value concerning the accuracy of a machine-learning model. For example, the accuracy/quality of the outputted metric machine-learning model may be averaged to determine an accuracy score. In some embodiments, an accuracy score may be determined based on the quality of the interconnection metric 148. Accuracy score or another score as described above may indicate a degree of retraining needed for a machine-learning model such as a classifier; processor 104 may perform a larger number of retraining cycles for a higher number (or lower number, depending on a numerical interpretation used), and/or may collect more training data for such retraining. The discussion within this paragraph and the paragraphs preceding this paragraph may apply to both the metric machine-learning model or any other machine-learning model/classifier mentioned herein.

With continued reference to FIG. 1, in one or more embodiments, processor 104 may implement one or more aspects of "generative artificial intelligence (AI)," is a type of AI that uses machine learning algorithms to create, establish, or otherwise generate data such as, without limitation, interconnection metrics 148, This may include in any data structure as described herein that is similar to one or more provided training examples. In an embodiment, machine learning module described herein may generate one or more generative machine learning models that are trained on one or more set of event training data and/or report training data. One or more generative machine learning models may be configured to generate new examples that are similar to the training data of the one or more generative machine learning models but are not exact replicas; for instance, and without limitation, data quality or attributes of the generated examples may bear a resemblance to the training data provided to one or more generative machine learning models, wherein the resemblance may pertain to underlying patterns, features, or structures found within the provided training data.

Still referring to FIG. 1, in some cases, generative machine learning models may include one or more generative models. As described herein, "generative models" refers to statistical models of the joint probability distribution $P(X,Y)$ on a given observable variable x, representing features or data that can be directly measured or observed (e.g. biological extraction clusters 116) and target variable y, representing the outcomes or labels that one or more generative models aims to predict or generate (e.g., an interconnection metric 148). In some cases, generative models may rely on Bayes theorem to find joint probability; for instance, and without limitation, Naïve Bayes classifiers may be employed by processor 104 to categorize input data such as, without limitation the biological extraction clusters 116.

In a non-limiting example, and still referring to FIG. 1, one or more generative machine learning models may include one or more Naïve Bayes classifiers generated, by processor 104, using a Naïve bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)÷P(B), where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction.

Still referring to FIG. 1, although Naïve Bayes classifier may be primarily known as a probabilistic classification algorithm; however, it may also be considered a generative model described herein due to its capability of modeling the joint probability distribution P(X,Y) over observable variables X and target variable Y. In an embodiment, Naïve Bayes classifier may be configured to make an assumption that the features X are conditionally independent given class label Y, allowing generative model to estimate the joint distribution as P(X,Y)=P(Y)ΠiP(Xi|Y), wherein P(Y) may be the prior probability of the class, and P(X_i|Y) is the conditional probability of each feature given the class. One or more generative machine learning models containing Naïve Bayes classifiers may be trained on labeled training data, estimating conditional probabilities P(X_i|Y) and prior probabilities P(Y) for each class; for instance, and without limitation, using techniques such as Maximum Likelihood Estimation (MLE). One or more generative machine learning models containing Naïve Bayes classifiers may select a class label y according to prior distribution P(Y), and for each feature X_i, sample at least a value according to conditional distribution P(X_i|y). Sampled feature values may then be combined to form one or more new data instance with selected class label y. In a non-limiting example, one or more generative machine learning models may include one or more Naïve Bayes classifiers to generate new examples of a comprehensive reports and/or a user scores based on inputs as described herein, wherein the models may be trained using training data containing a plurality of features, and/or the like as input correlated to a plurality of labeled classes.

Still referring to FIG. 1, in some cases, one or more generative machine learning models may include generative adversarial network (GAN). As used in this disclosure, a "generative adversarial network" is a type of artificial neural network with at least two sub models (e.g., neural networks), a generator, and a discriminator, that compete against each other in a process that ultimately results in the generator learning to generate new data samples, wherein the "generator" is a component of the GAN that learns to create hypothetical data by incorporating feedbacks from the "discriminator" configured to distinguish real data from the hypothetical data. In some cases, generator may learn to make discriminator classify its output as real. In an embodiment, discriminator may include a supervised machine learning model while generator may include an unsupervised machine learning model as described in further detail with reference to FIG. 3.

With continued reference to FIG. 1, in an embodiment, discriminator may include one or more discriminative models, i.e., models of conditional probability P(Y|X=x) of target variable Y, given observed variable X. In an embodiment, discriminative models may learn boundaries between classes or labels in given training data. In a non-limiting example, discriminator may include one or more classifiers as described in further detail below with reference to FIG. 3 to distinguish between different categories, or states e.g., TRUE vs. FALSE within the context of generated data such as, without limitations, a comprehensive report and/or a user score, and/or the like. In some cases, processor 104 may implement one or more classification algorithms such as, without limitation, Support Vector Machines (SVM), Logistic Regression, Decision Trees, and/or the like to define decision boundaries.

Still referring to FIG. 1, a metric machine-learning model may include a large language model (LLM). A LLM may be a type of generative machine-learning model, as described above. A "large language model," as used herein, is a deep learning algorithm that can recognize, summarize, translate, predict and/or generate text and other content based on knowledge gained from massive datasets. Large language model may be trained on large sets of data; for example, training sets may include greater than 1 million words. Training sets may be drawn from diverse sets of data such as, as non-limiting examples, novels, blog posts, articles, emails, medical records, medical textbooks, medical research, medical journals, and the like. In some embodiments, training sets may include a variety of subject matters, such as, as nonlimiting examples, user specific medical records, biological extractions, fitness records, dietary records, user communications, and the like. In some embodiments, training sets of LLM may include examples of interconnection metrics 148. In some embodiments, training sets of LLM may include information from one or more public or private databases. As a non-limiting example, training sets may include databases associated with an entity.

With continued reference to FIG. 1, in some embodiments, LLM may be generally trained. For the purposes of this disclosure, "generally trained" means that LLM is trained on a general training set comprising a variety of subject matters, data sets, and fields. In some embodiments, LLM may be initially generally trained. In some embodiments, for the purposes of this disclosure, LLM may be specifically trained. For the purposes of this disclosure, "specifically trained" means that LLM is trained on a specific training set, wherein the specific training set includes data including specific correlations for LLM to learn. As a non-limiting example, LLM may be generally trained on a general training set, then specifically trained on a specific training set. As a non-limiting example, specific training set may include examples of comprehensive reports. As a non-limiting example, specific training set may include scholastic works. As a non-limiting example, specific training set may include information from a database. As a non-limiting example, specific training set may include text related to the users such as biological extractions 108, biological extraction clusters 116, and the like.

With continued reference to FIG. 1, LLM, in some embodiments, may include Generative Pretrained Transformer (GPT), GPT-2, GPT-3, GPT-4, and the like. GPT, GPT-2, GPT-3, and GPT-4 are products of Open AI Inc., of San Francisco, CA. LLM may include a text prediction based algorithm configured to receive an article and apply a probability distribution to the words already typed in a sentence to work out the most likely word to come next in augmented articles. For example, if the words already typed are "Nice to meet", then it is highly likely that the word "you" will come next. LLM may output such predictions by ranking words by likelihood or a prompt parameter. For the example given above, the LLM may score "you" as the most likely, "your" as the next most likely, "his" or "her" next, and the like. LLM may include an encoder component and a decoder component.

Still referring to FIG. 1, LLM may include a transformer architecture. In some embodiments, encoder component of LLM may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, LLM and/or transformer architecture may include an attention mechanism. An "attention mechanism," as used herein, is a part of a neural architecture that enables a system to dynamically quantify the relevant features of the input data. In the case of natural language processing, input data may be a sequence of textual elements. It may be applied directly to the raw input or to its higher-level representation.

With continued reference to FIG. 1, an attention mechanism may represent an improvement over a limitation of the Encoder-Decoder model. The encoder-decider model encodes the input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, LLM may predict the next word by searching for a set of position in a source sentence where the most relevant information is concentrated. LLM may then predict the next word based on context vectors associated with these source positions and all the previously generated target words, such as textual data of a dictionary correlated to a prompt in a training data set. A "context vector," as used herein, are fixed-length vector representations useful for document retrieval and word sense disambiguation.

Still referring to FIG. 1, an attention mechanism may include generalized attention self-attention, multi-head attention, additive attention, global attention, and the like. In generalized attention, when a sequence of words or an image is fed to LLM, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, LLM may pick up particular parts at different positions in the input sequence and over time compute an initial composition of the output sequence. In multi-head attention, LLM may include a transformer model of an attention mechanism. Attention mechanisms, as described above, may provide context for any position in the input sequence. For example, if the input data is a natural language sentence, the transformer does not have to process one word at a time. In multi-head attention, computations by LLM may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bandanau attention mechanism), LLM may make use of attention alignment scores based on a number of factors. These alignment scores may be calculated at different points in a neural network. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, LLM may either attend to all source words or predict the target sentence, thereby attending to a smaller subset of words.

With continued reference to FIG. 1, multi-headed attention in encoder may apply a specific attention mechanism called self-attention. Self-attention allows the models to associate each word in the input, to other words. So, as a non-limiting example, the LLM may learn to associate the word "you", with "how" and "are". It's also possible that LLM learns that words structured in this pattern are typically a question and to respond appropriately. In some embodiments, to achieve self-attention, input may be fed into three distinct fully connected layers to create query, key, and value vectors. The query, key, and value vectors maybe fed through a linear layer; then, the query and key vectors may be multiplies using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

With continued reference to FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

With continued reference to FIG. 1, transformer architecture may include a decoder. Decoder may a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With continued reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am", decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves zero attention scores for "future tokens."

With continued reference to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that class will be of size 10,000. The output of this classifier may be fed into a softmax layer which may serve to produce probability scores between zero and one. The index may be taken of the highest probability score in order to determine a predicted word.

With continued reference to FIG. 1, decoder may take this output and add it to the decoder inputs. Decoder may continue decoding until a token is predicted. Decoder may stop decoding once it predicts an end token.

With continued reference to FIG. 1, in some embodiment, decoder may be stacked N layers high, with each layer taking in inputs from the encoder and layers before it. Stacking layers may allow LLM to learn to extract and focus on different combinations of attention from its attention heads.

With continued reference to FIG. 1, LLM may receive an input. Input may include a string of one or more characters. For example, input may include one or more words, a sentence, a paragraph, a thought, a query, and the like. A "query" for the purposes of the disclosure is a string of characters that poses a question. In some embodiments, input may be received from a user device. User device may be any computing device that is used by a user. As non-limiting examples, user device may include desktops, laptops, smartphones, tablets, and the like. Query may include, for example a question asking for a status update regarding a to-do list. In some embodiments, input may include a biological extraction clusters 116 associated with the user.

With continued reference to FIG. 1, LLM may generate an output. In some embodiments, LLM may include multiple sets of transformer architecture as described above. Output may include a textual output. A "textual output," for the purposes of this disclosure is an output comprising a string of one or more characters. Textual output may include, for example a comprehensive report. In some embodiments, textual output may include a phrase or sentence identifying the status of a user query. In some embodiments, textual output may include a sentence or plurality of sentences describing a response to a user query. As a non-limiting examples, this may include, restrictions, timing, advice, dangers, benefits, and the like. In an embodiment, this may include generating an interconnection metric 148 based on the comparison of two or more biological extraction clusters. For example, the LLM may compare two of more biological extraction clusters associated with a symptoms related cancer. The textual output may identify an interconnection metric 148 that discusses how the two patent's symptoms are similar in the way that they respond to treatment.

With continued reference to FIG. 1, processor 104 may connect two or more users based on similar biological extraction clusters 116 and/or interconnection metric 148. A user may include a patient or his/her medical representative. This may include any medical professional associated with the patient. In an embodiment, processor 104 may match users according to the biological extraction clusters 116 that are compared to generate the interconnection metric 148. In some cases, two or more users may be selected to be connected based on one or more similarities within a patient's biological extraction 108. For example, users who share the same symptoms or diagnosis may be connected. Processor 104 may pair two or more users, wherein connecting the users may include establishing a communication protocol between the users. This may allow each user to interact with each other using a chatroom, audio call, video call, instant messenger, direct messages, and the like. A connection between two or more users may additionally include the exchange of contact information between the individuals. In a non-limiting example, processor 104 may connect two or more users wherein at least one user is a medical professional, and a second user is a patient. Processor 104 may facilitate communication between each of these user's using chatroom or video call. Contact information may include social media, websites, email, phone number, and the like. Connecting two or more user fosters a collaborative environment where users can share experiences, insights, and support, enhancing their journey with their given ailments. In some cases, this feature may allow medical professionals to send an analysis guide to users to help them understand the results of their biological extraction. this feature may enrich the user experience but also promotes a sense of belonging and camaraderie within the platform, ultimately strengthening the community and its users' overall well-being.

With continued reference to FIG. 1, processor 104 may generate diagnostic data as a function of the interconnection metric 148. As used in the current disclosure, "diagnostic data" is data associated with the diagnosis of a user's medical condition or health issue. Processor 104 may generate diagnostic data as a function of the collected and analyzed data from the biological extraction 108, biological extraction clusters 116, and interconnection metric 148. Diagnostic data may identify the condition of or name of the disease the user is suffering from based on known conditions/symptoms of the user and how similar those conditions/symptoms are to other individuals. In a non-limiting example, two users are suffering from similar symptoms according to the interconnection metric 148. The first user has not been diagnosed with a condition while the second user has been diagnosed with a condition. Processor 104 may diagnose via the interconnection metric 148 the first user with the same condition as the second user. Processor 104 may generate diagnostic data by identifying and extracting essential features or attributes from the biological extraction clusters 116 that make each case analogous. Features may include specific symptoms, test results, demographic information, or other relevant data points. Feature extraction may involve identifying and transforming the symptom-related information from raw data into structured, quantifiable features that can be used by processor 104. In some cases, these features may be normalized to create a uniform diagnostic score. As used in the current disclosure, a "diagnostic score" is a score representing how similar/dissimilar two or patients features are. A diagnostic score may be reflected as numerical score (i.e. 1-10, 1-100, 1-1000, and the like). The diagnostic score may be compared to a diagnostic threshold. A diagnostic threshold may be a similarity threshold between two or more users in order to successfully diagnose a user with a condition. In some cases, processor 104 may be configured to leverage specialized medical ontologies and dictionaries, such as SNOMED CT (Systematized Nomenclature of Medicine-Clinical Terms) or UMLS (Unified Medical Language System), to map symptom-related terms to standardized medical concepts. This ensures consistency and interoperability in the extracted features. In some cases, input from a medical professional may be used to adjust weights and connections on features of the biological extraction clusters. These adjustments may be done to generate a more accurate and precise diagnostic data.

With continued reference to FIG. 1, processor 104 may be configured to anonymize the plurality of biological extractions 108 using an anonymization process. As used in the current disclosure, an "anonymization process" is the process of removing or altering identifiable information from the records to protect the privacy and confidentiality of individuals while retaining the usefulness and integrity of the data for research, analysis, or other purposes. The anonymization process may involve identifying the identifiable information in the biological extractions 108, biological clusters 116, and interconnection metric 148. As used in the current disclosure, "identifiable information" is any data that can be used to identify a specific individual. This information allows one to distinguish or trace an individual's identity either directly or indirectly. It is important to handle identifiable information with care to protect privacy and ensure compliance with data protection laws and regulations. Identifiable may include names, addresses, phone numbers, social security numbers, email addresses, date of birth, specific geographic locations, and any other unique identifiers. The anonymization process may then remove or replace direct identifiers (e.g., names, addresses, birth dates) with a unique identifier or code. This helps to disassociate the data from the individual. In some cases, the anonymization process may anonymize the identifiable information by grouping information into broader categories or ranges. For example, instead of providing an exact age, provide an age range (e.g., 30-40 years old). This makes it harder to identify specific individuals. Additionally, the anonymization process may anonymize the identifiable information by replacing direct identifiers with pseudonyms (e.g., assigning a unique random ID to each individual). This allows for tracking and analysis without revealing the actual identity. In some cases, processor 104 may modify dates (e.g., admission dates, appointment dates) by shifting them within a defined range to maintain temporal relationships without revealing exact dates. By implementing this anonymization process, healthcare organizations can preserve data utility for research and analysis while mitigating privacy risks and maintaining compliance with privacy and data protection standards.

Figure 2:
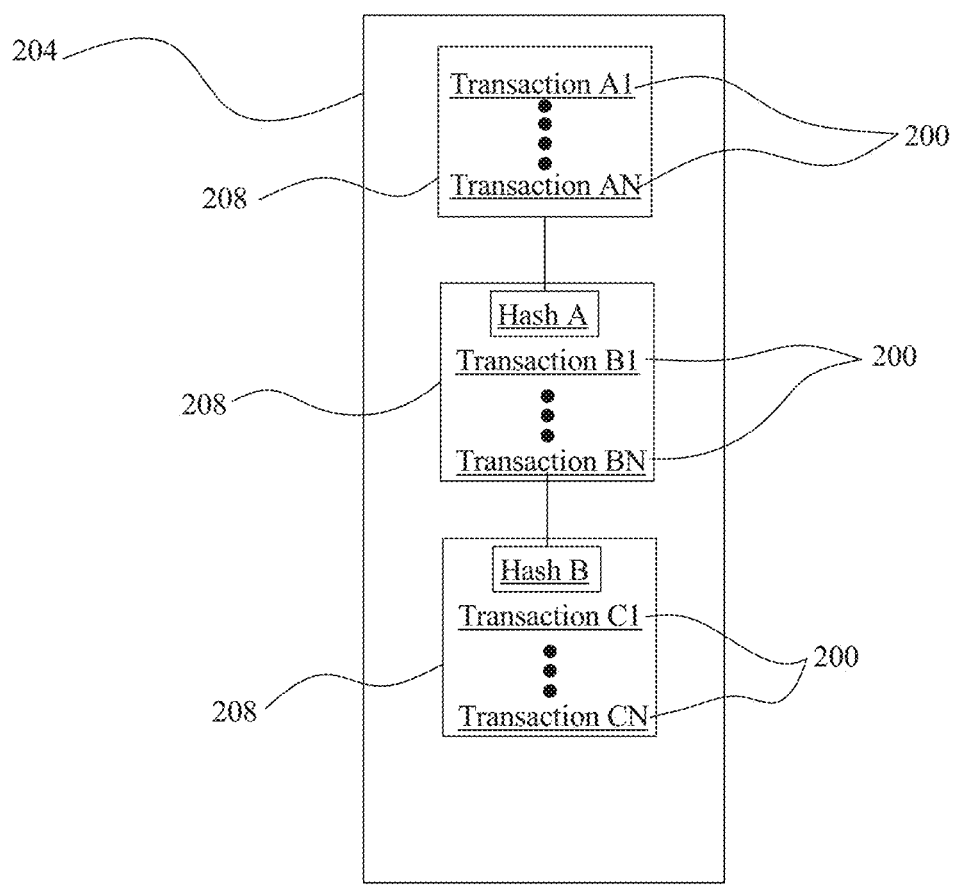
FIG. 2 illustrates a diagram of an embodiment immutable sequence.

Referring now to FIG. 2, an exemplary embodiment of an immutable sequential listing 200 is illustrated. Data elements are listing in immutable sequential listing 200; data elements may include any form of data, including textual data, image data, encrypted data, cryptographically hashed data, and the like. Data elements may include, without limitation, one or more at least a digitally signed assertions. In one embodiment, a digitally signed assertion 204 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 204. In an embodiment, collection of textual data states that the owner of a certain transferable item represented in a digitally signed assertion 204 register is transferring that item to the owner of an address. A digitally signed assertion 204 may be signed by a digital signature created using the private key associated with the owner's public key, as described above.

Still referring to FIG. 2, a digitally signed assertion 204 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion 204 may describe the transfer of a physical good; for instance, a digitally signed assertion 204 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 204 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 2, in one embodiment, an address is a textual datum identifying the recipient of virtual currency or another item of value in a digitally signed assertion 204. In some embodiments, address is linked to a public key, the corresponding private key of which is owned by the recipient of a digitally signed assertion 204. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 204 may record a subsequent a digitally signed assertion 204 transferring some or all of the value transferred in the first a digitally signed assertion 204 to a new address in the same manner. A digitally signed assertion 204 may contain textual information that is not a transfer of some item of value in addition to, or as an alternative to, such a transfer. For instance, as described in further detail below, a digitally signed assertion 204 may indicate a confidence level associated with a distributed storage node as described in further detail below.

In an embodiment, and still referring to FIG. 2 immutable sequential listing 200 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 200 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 2, immutable sequential listing 200 may preserve the order in which the at least a posted content took place by listing them in chronological order; alternatively or additionally, immutable sequential listing 200 may organize digitally signed assertions 204 into sub-listings 208 such as "blocks" in a blockchain, which may be themselves collected in a temporally sequential order; digitally signed assertions 204 within a sub-listing 208 may or may not be temporally sequential. The ledger may preserve the order in which at least a posted content took place by listing them in sub-listings 208 and placing the sub-listings 208 in chronological order. The immutable sequential listing 200 may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 200 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 2, immutable sequential listing 200, once formed, may be inalterable by any party, no matter what access rights that party possesses. For instance, immutable sequential listing 200 may include a hash chain, in which data is added during a successive hashing process to ensure non-repudiation. Immutable sequential listing 200 may include a block chain. In one embodiment, a block chain is immutable sequential listing 200 that records one or more new at least a posted content in a data item known as a sub-listing 208 or "block." An example of a block chain is the BITCOIN block chain used to record BITCOIN transactions and values. Sub-listings 208 may be created in a way that places the sub-listings 208 in chronological order and link each sub-listing 208 to a previous sub-listing 208 in the chronological order so that any computing device may traverse the sub-listings 208 in reverse chronological order to verify any at least a posted content listed in the block chain. Each new sub-listing 208 may be required to contain a cryptographic hash describing the previous sub-listing 208. In some embodiments, the block chain contains a single first sub-listing 208 sometimes known as a "genesis block."

Still referring to FIG. 2, the creation of a new sub-listing 208 may be computationally expensive; for instance, the creation of a new sub-listing 208 may be designed by a "proof of work" protocol accepted by all participants in forming the immutable sequential listing 200 to take a powerful set of computing devices a certain period of time to produce. Where one sub-listing 208 takes less time for a given set of computing devices to produce the sub-listing 208 protocol may adjust the algorithm to produce the next sub-listing 208 so that it will require more steps; where one sub-listing 208 takes more time for a given set of computing devices to produce the sub-listing 208 protocol may adjust the algorithm to produce the next sub-listing 208 so that it will require fewer steps. As an example, protocol may require a new sub-listing 208 to contain a cryptographic hash describing its contents; the cryptographic hash may be required to satisfy a mathematical condition, achieved by having the sub-listing 208 contain a number, called a nonce, whose value is determined after the fact by the discovery of the hash that satisfies the mathematical condition. Continuing the example, the protocol may be able to adjust the mathematical condition so that the discovery of the hash describing a sub-listing 208 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 208 according to the protocol is known as "mining." The creation of a new sub-listing 208 may be designed by a "proof of stake" protocol as will be apparent to those skilled in the art upon reviewing the entirety of this disclosure.

Continuing to refer to FIG. 2, in some embodiments, protocol also creates an incentive to mine new sub-listings 208. The incentive may be financial; for instance, successfully mining a new sub-listing 208 may result in the person or entity that mines the sub-listing 208 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 208. Each sub-listing 208 created in immutable sequential listing 200 may contain a record or at least a posted content describing one or more addresses that receive an incentive, such as virtual currency, as the result of successfully mining the sub-listing 208.

With continued reference to FIG. 2, where two entities simultaneously create new sub-listings 208, immutable sequential listing 200 may develop a fork; protocol may determine which of the two alternate branches in the fork is the valid new portion of the immutable sequential listing 200 by evaluating, after a certain amount of time has passed, which branch is longer. "Length" may be measured according to the number of sub-listings 208 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 208 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 200 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 200.

Still referring to FIG. 2, additional data linked to at least a posted content may be incorporated in sub-listings 208 in the immutable sequential listing 200; for instance, data may be incorporated in one or more fields recognized by block chain protocols that permit a person or computer forming a at least a posted content to insert additional data in the immutable sequential listing 200. In some embodiments, additional data is incorporated in an unspendable at least a posted content field. For instance, the data may be incorporated in an OP RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 2, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 208 in a block chain computationally challenging; the incentive for producing sub-listings 208 may include the grant of new crypto-currency to the miners. Quantities of crypto-currency may be exchanged using at least a posted content as described above.

Figure 3:
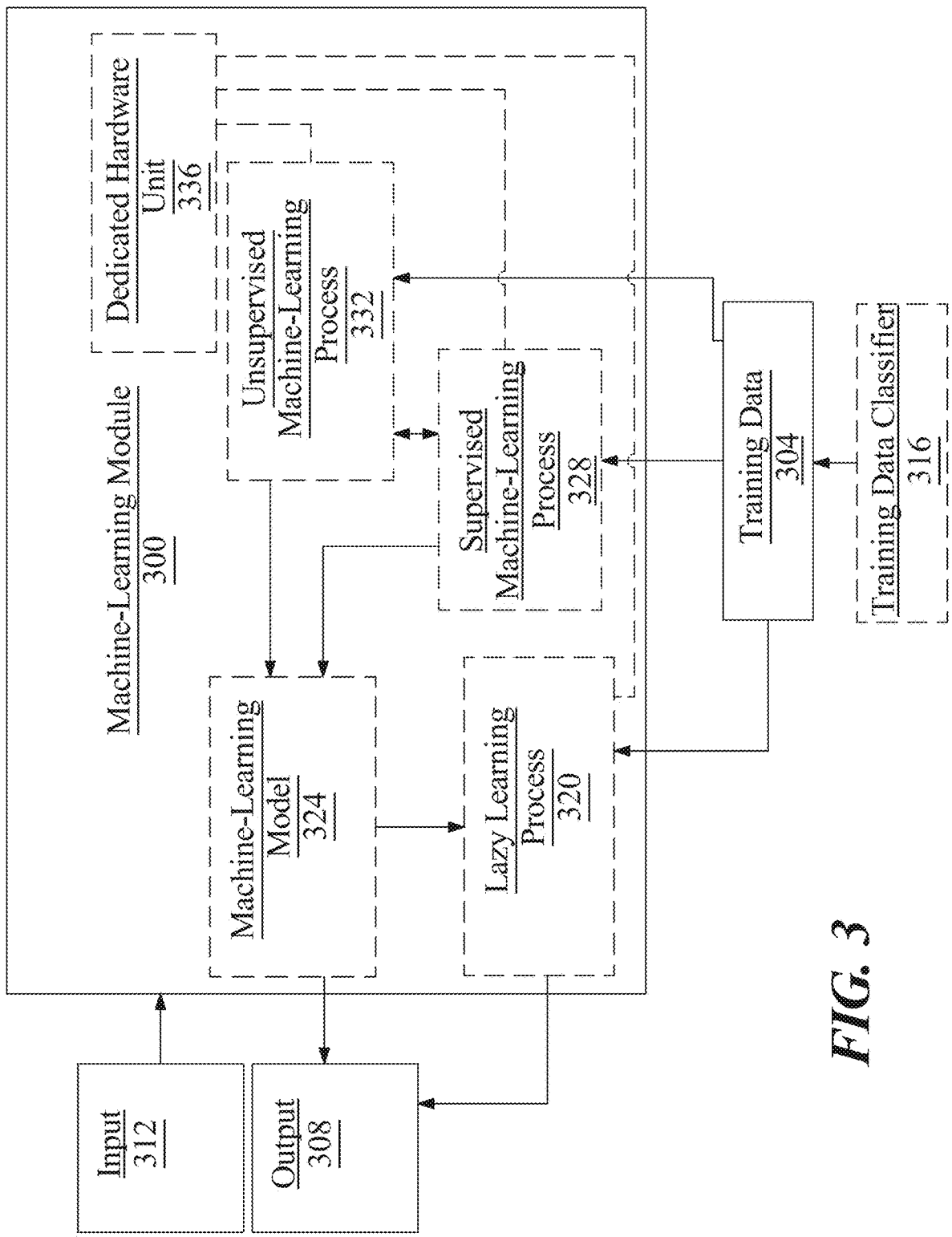
FIG. 3 is a block diagram a machine learning module embodiment.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, inputs include a plurality of biological extraction clusters 116 as inputs correlated to an example of an interconnection metric 148 as outputs.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to biological extraction clusters 116 that are similarly situated to the user by demographic factors (i.e. age, gender, ethnicity, height, weight, and the like).

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may identified as having poor quality data, where "poor quality" is defined as having a signal to noise ratio below a threshold value.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units In some embodiments, and with continued reference to FIG. 3, computing device, processor, and/or module may down-sample elements of a training example to a desired lower number of data elements. As a non-limiting example, a high pixel count image may have 356 pixels, however a desired number of pixels may be 128. Processor may downsample the high pixel count image to convert the 356 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include biological extraction clusters 116 as described above as inputs interconnected metrics 148 as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
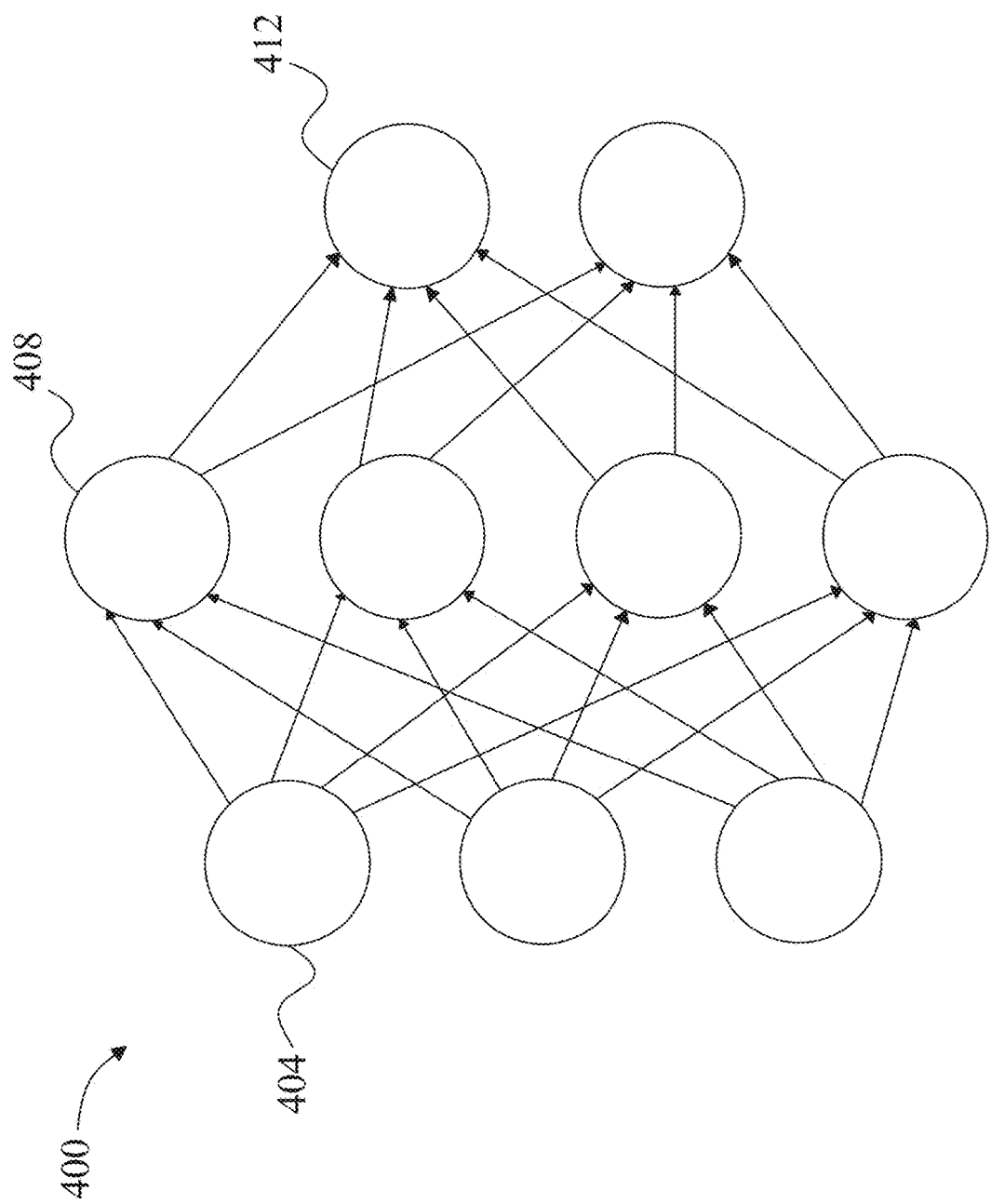
FIG. 4 is a diagram of an embodiment of a neural network.

Referring now to FIG. 4 an exemplary embodiment of neural network 400 is illustrated. Neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to input nodes 404, a suitable training algorithm (such as Levenberg-Marquardt, conjugate gradient, simulated annealing, or other algorithms) is then used to adjust the connections and weights between nodes in adjacent layers 408 of the neural network to produce the desired values at output nodes 412. This process is sometimes referred to as deep learning.

Figure 5:
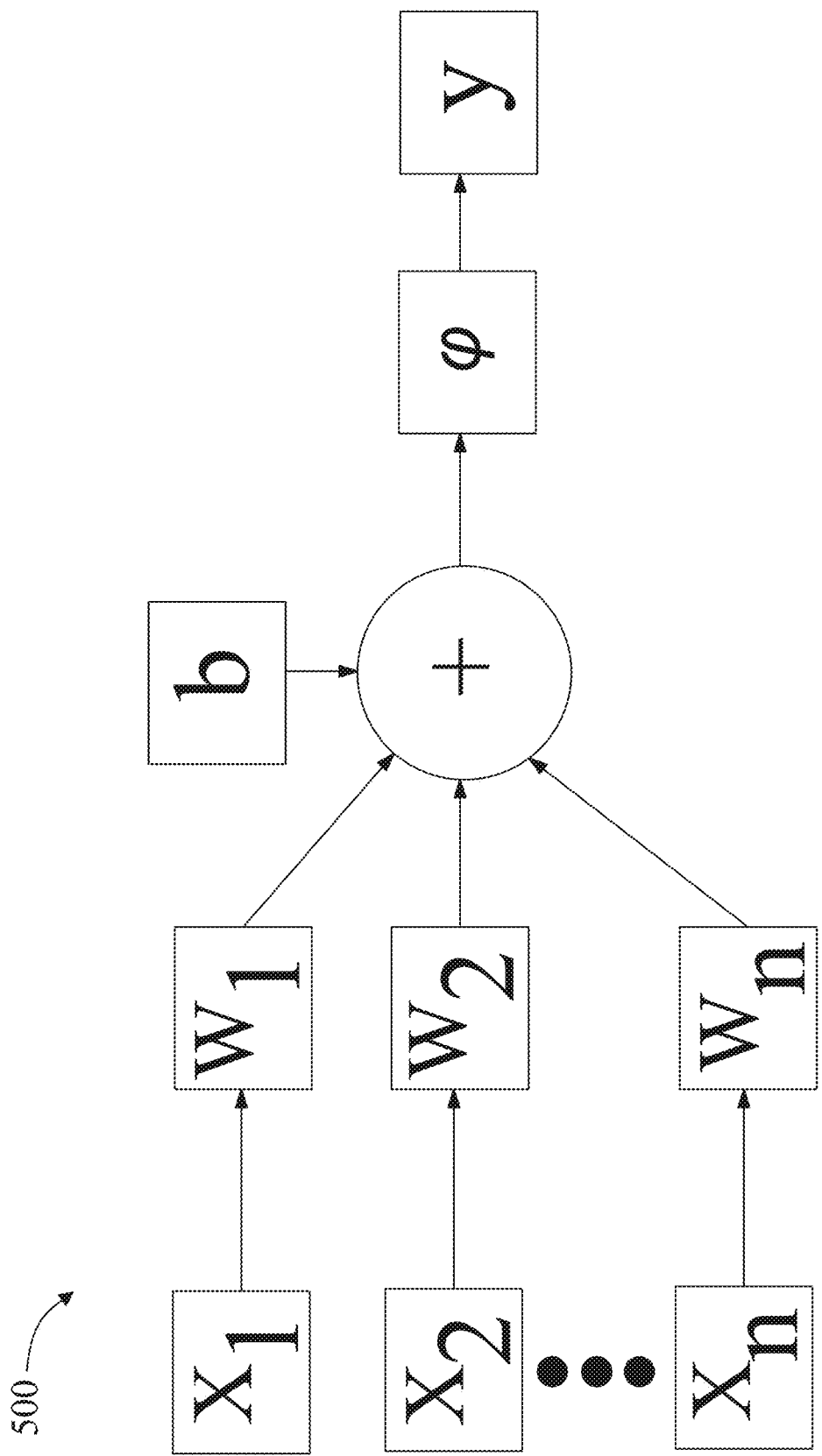
FIG. 5 is a flow diagram of an exemplary embodiment of a node of a neural network.

Referring now to FIG. 5, an exemplary embodiment of a node 500 of a neural network is illustrated. A node 500 may include, without limitation a plurality of inputs $x_i$ that may receive numerical values from inputs to a neural network containing the node and/or from other nodes. Node 400 may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function co, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Still referring to FIG. 5, a neural network may, for example without limitation, receive a desired endocrine change as input and output at least a mode element. Additionally, or alternatively, a neural network may, for example without limitation, at least a mode element as input and output an anticipated BMI change. In some cases, a neural network may, for example without limitation, classify at least biological extraction cluster or biological extraction to at biological extraction cluster category or biological extraction cluster. In some cases, a neural network may additionally output a probability of classification to a predetermined class according to weights $w_i$ that are derived using machine-learning processes as described in this disclosure.

Figure 6:
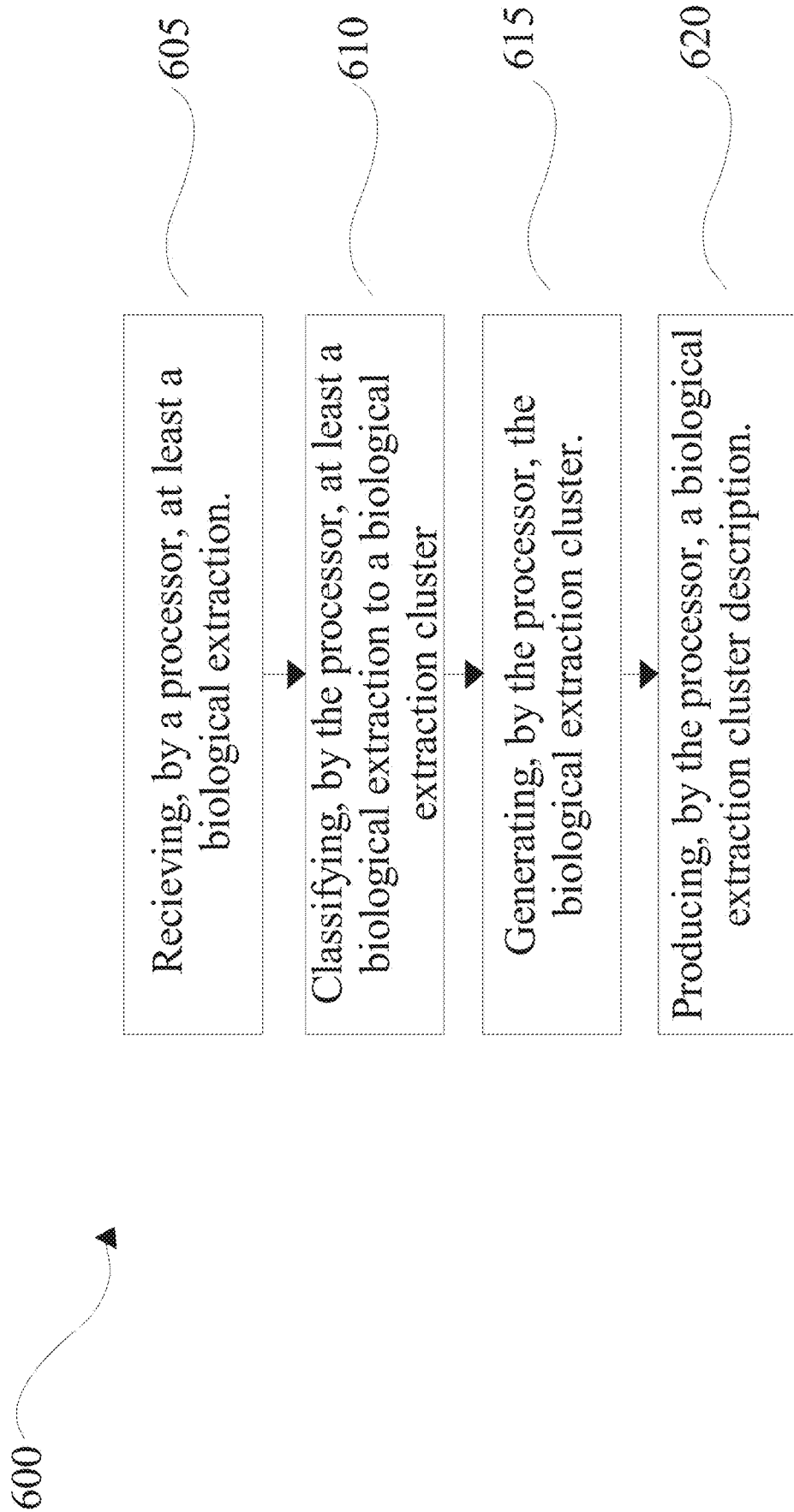
FIG. 6 is a diagram illustrating the method for generating keys associated with biological extraction cluster categories.

Now referencing FIG. 6, method 600 for generating keys associates with biological extraction cluster categories is shown by way of a flowchart. At step 605, computing device 104 may receive at least a biological extraction. The biological extraction may contain a biological extraction element. Biological extraction may be submitted by a user. This may be implemented as described throughout this disclosure, for instance in reference to FIGS. 1-5.

At step 610, computing device 104 may classifies at least a biological extraction a biological extraction cluster. A biological extraction cluster may have biological extractions grouped together based on common biological extraction elements. Biological extraction clusters may be non-disjointed. This may be implemented as described throughout this disclosure, for instance with reference to FIGS. 1-5.

At step 615, computing device 104 may generate the biological extraction cluster. Generation may utilize machine learning processes, machine learning algorithms, classifiers and the like. This may be implemented as described throughout this disclosure, for instance with reference to FIGS. 1-5.

At step 620, computing device 104 may produce a biological extraction cluster description. A biological extraction cluster description may be utilized to identify the biological extraction cluster on an immutable sequential spread. Biological extraction cluster description may include a digest that is digitally signed with a cluster key. This may be implemented as described throughout this disclosure, for instance with references to FIGS. 1-5.

Figure 7:
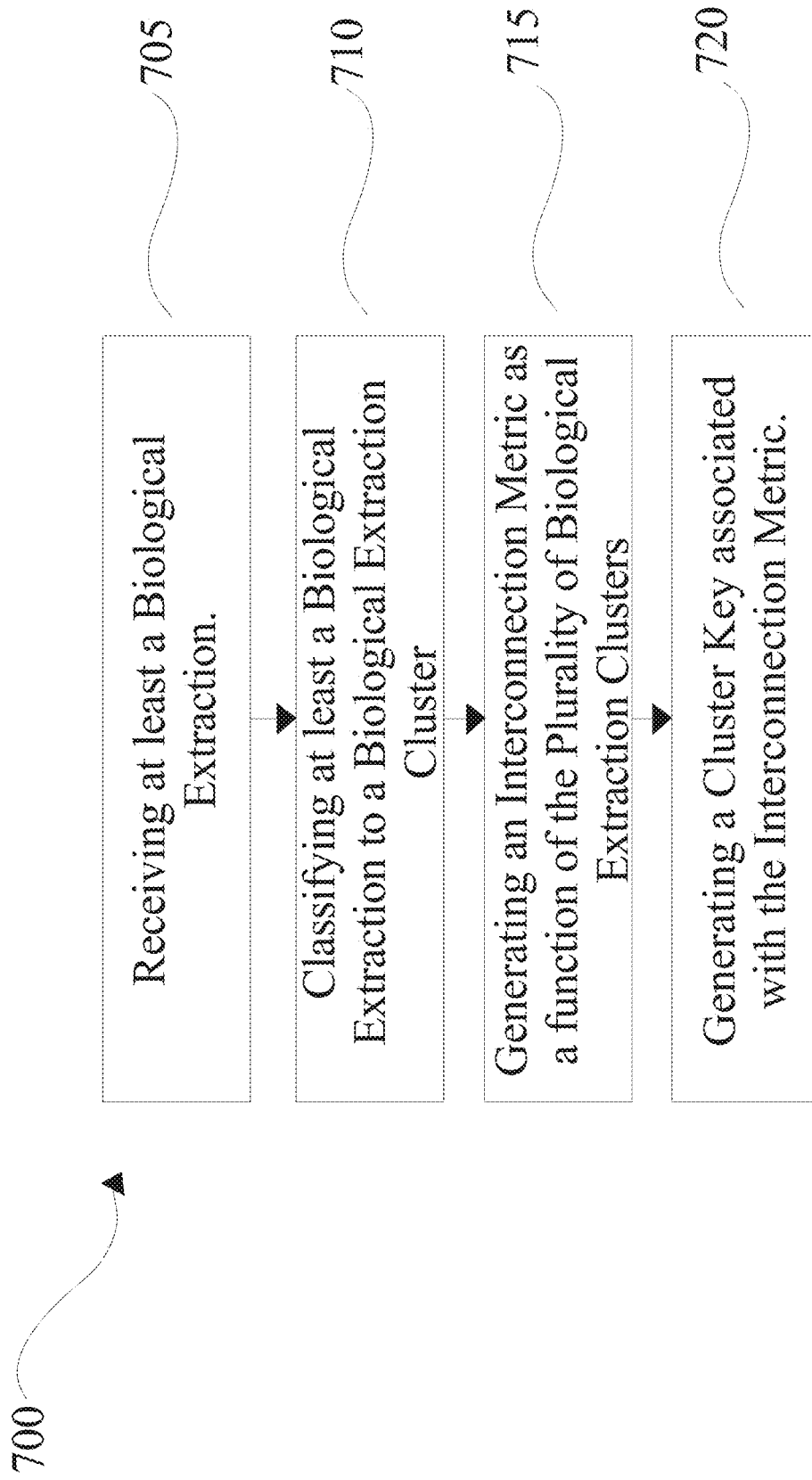
FIG. 7 is a diagram illustrating the method for generating cryptographic keys associated with biological extraction data.

Referring now to FIG. 7, a flow diagram of an exemplary method 700 for generating cryptographic keys associated with a biological extraction is illustrated. At step 705, method 700 includes receiving a plurality of biological extractions from a plurality of users. This may be implemented as described and with reference to FIGS. 1-7.

Still referring to FIG. 7, at step 710, method 700 includes classifying each of the plurality of biological extractions to a plurality of biological extraction clusters. This may be implemented as described and with reference to FIGS. 1-7. In an embodiment, the plurality of biological extractions may be posted to an immutable sequential listing. In an additional embodiment, the method may further include generating, using the at least a processor, a biological extraction cluster description as a function of the plurality of biological extraction clusters. Producing the biological extraction cluster description may further include updating the biological extraction cluster description using a timestamp validation confirmation. In some cases, updating the biological extraction cluster description using the timestamp validation confirmation may further include re-generating a new biological extraction cluster description. In additional embodiment, the method may further include anonymizing, using the at least a processor, the plurality of biological extractions using an anonymization process. Anonymizing the plurality of biological extractions may further include locating identifiable information associated with the plurality of biological extractions Still referring to FIG. 7, at step 715, method 700 includes generating an interconnection metric as a function of a comparison between the plurality of biological extraction clusters. Generating the interconnection metric includes iteratively training a metric machine learning model using metric training data, wherein the metric training data includes the plurality of biological extractions as inputs correlated to the interconnection metric as an output. Generating the interconnection metric also includes generating the interconnection metric using a trained metric machine learning model. This may be implemented as described and with reference to FIGS. 1-7. In an embodiment, the method may include generating, using the at least a processor, diagnostic data as a function of the interconnection metric. In an additional embodiment, the method may further include connecting, using the at least a processor, at least two users of the plurality of user as a function of the interconnection metric.

Still referring to FIG. 7, at step 720, method 700 includes generating a cluster key associated with the interconnection metric. This may be implemented as described and with reference to FIGS. 1-7. In an embodiment, wherein the cluster key may include a decentralized token.

Figure 8:
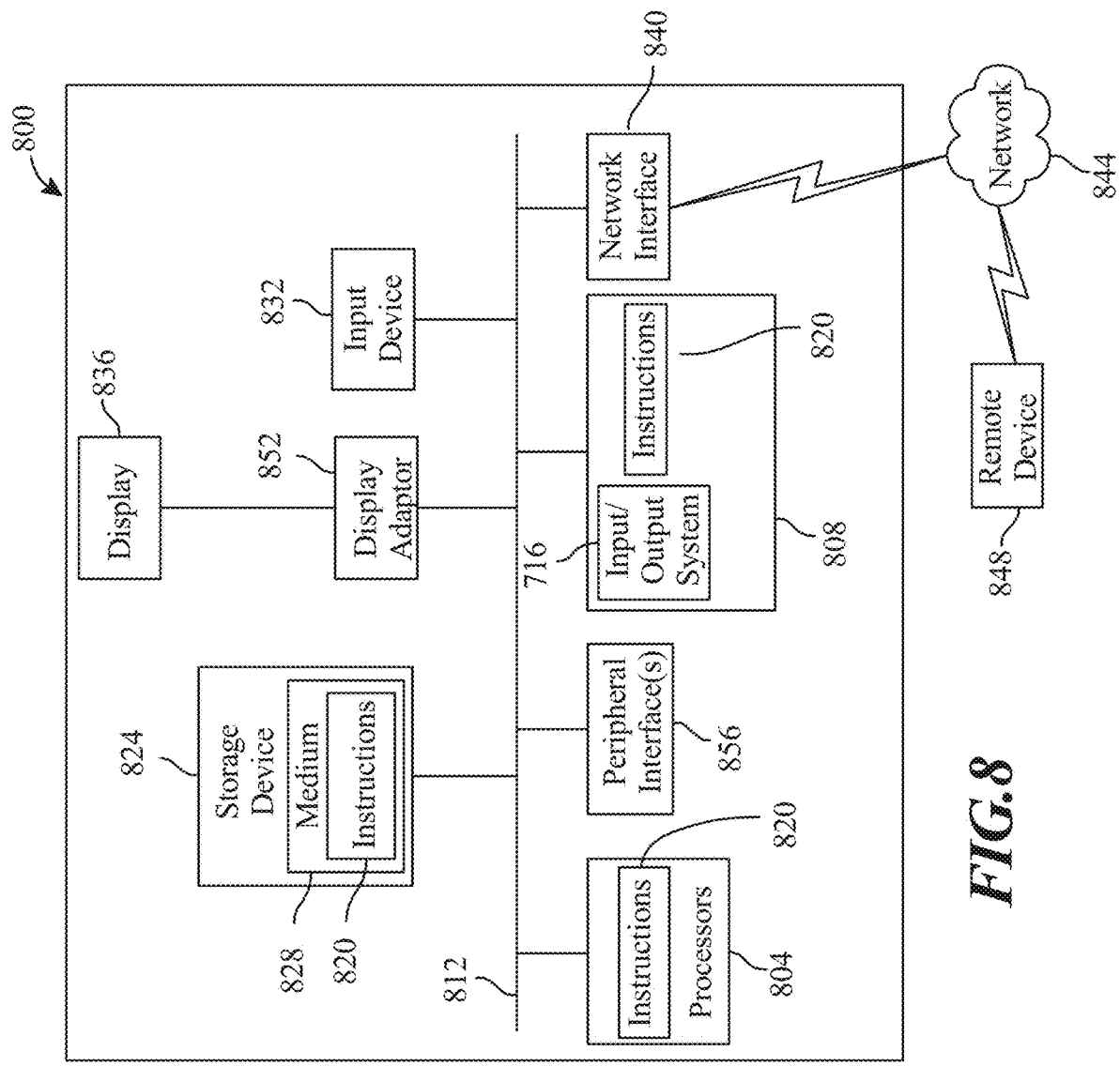
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating cryptographic keys associated with a biological extraction, the apparatus comprising:
    at least a processor; and
    a memory communicatively connected to the at least a processor, the memory containing instructions configuring the processor to:
        receive a plurality of biological extractions from a plurality of users;
        classify each of the plurality of biological extractions to a plurality of biological extraction clusters;
        generate an interconnection metric as a function of a comparison between the plurality of biological extraction clusters, wherein generating the interconnection metric comprises:
            iteratively training a metric machine learning model using metric training data, wherein the metric training data comprises the plurality of biological extractions as inputs correlated to the interconnection metric as an output; and
            generating the interconnection metric using a trained metric machine learning model; and
        generate a cluster key associated with the interconnection metric and a biological extraction cluster of the plurality of biological extraction clusters.

2. The apparatus of claim 1, wherein the cluster key comprises a decentralized token.

3. The apparatus of claim 1, wherein the memory further instructs the processor to generate diagnostic data for the plurality of biological extraction clusters as a function of the interconnection metric, wherein generating the diagnostic data comprises extracting essential attributes from the plurality of biological extraction clusters as a function of the interconnection metric.

4. The apparatus of claim 1, wherein the memory further instructs the processor to generate a biological extraction cluster description as a function of the plurality of biological extraction clusters.

5. The apparatus of claim 4, wherein the biological extraction cluster description is signed by the cluster key.

6. The apparatus of claim 4, wherein generating the biological extraction cluster description further comprises updating the biological extraction cluster description using a timestamp validation confirmation.

7. The apparatus of claim 6, wherein updating the biological extraction cluster description using the timestamp validation confirmation further comprises re-generating a new biological extraction cluster description as a function of the availability of new records.

8. The apparatus of claim 1, wherein the memory further instructs the processor to anonymize the plurality of biological extractions using an anonymization process.

9. The apparatus of claim 8, wherein anonymizing the plurality of biological extractions further comprises:
    locating identifiable information associated with the plurality of biological extractions; and
    replacing the identifiable information with a unique identifier.

10. The apparatus of claim 1, wherein the memory further instructs the processor to communicatively connect at least two users of the plurality of user as a function of the interconnection metric using a chatroom.

11. A method for generating cryptographic keys associated with a biological extraction, the method comprising:
    receiving, using at least a processor, a plurality of biological extractions from a plurality of users;
    classifying, using the at least a processor, each of the plurality of biological extractions to a plurality of biological extraction clusters;
    generating, using the at least a processor, an interconnection metric as a function of a comparison between the plurality of biological extraction clusters, wherein generating the interconnection metric comprises:
        iteratively training a metric machine learning model using metric training data, wherein the metric training data comprises the plurality of biological extractions as inputs correlated to the interconnection metric as an output; and
        generating the interconnection metric using a trained metric machine learning model; and
    generating, using the at least a processor, a cluster key associated with the interconnection metric and a biological extraction cluster of the plurality of biological extraction clusters.

12. The method of claim 11, wherein the cluster key comprises a decentralized token.

13. The method of claim 11, wherein the method further comprises generating, using the at least a processor, diagnostic data for the plurality of biological extraction clusters as a function of the interconnection metric, wherein generating the diagnostic data comprises extracting essential attributes from the plurality of biological extraction clusters as a function of the interconnection metric.

14. The method of claim 11, wherein the method further comprises generating, using the at least a processor, a biological extraction cluster description as a function of the plurality of biological extraction clusters.

15. The method of claim 14, wherein the biological extraction cluster description is signed by the cluster key.

16. The method of claim 14, wherein generating the biological extraction cluster description further comprises updating the biological extraction cluster description using a timestamp validation confirmation.

17. The method of claim 16, wherein updating the biological extraction cluster description using the timestamp validation confirmation further comprises re-generating a new biological extraction cluster description as a function of the availability of new records.

18. The method of claim 11, wherein the method further comprises anonymizing, using the at least a processor, the plurality of biological extractions using an anonymization process.

19. The method of claim 18, wherein anonymizing the plurality of biological extractions further comprises:
   locating identifiable information associated with the plurality of biological extractions; and
   replacing the identifiable information with an unique identifier.

20. The method of claim 11, wherein the method further comprises communicatively connecting, using the at least a processor, at least two users of the plurality of users as a function of the interconnection metric using a chatroom.

* * * * *